US010780343B2

(12) United States Patent
Chou et al.

(10) Patent No.: US 10,780,343 B2
(45) Date of Patent: Sep. 22, 2020

(54) GAME CONTROLLER

(71) Applicant: CHENG UEI PRECISION INDUSTRY CO., LTD., New Taipei (TW)

(72) Inventors: Hsieh Cheng Chou, New Taipei (TW); Chi Ming Tseng, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 204 days.

(21) Appl. No.: 16/188,539

(22) Filed: Nov. 13, 2018

(65) Prior Publication Data
US 2020/0030693 A1 Jan. 30, 2020

(30) Foreign Application Priority Data

Jul. 30, 2018 (TW) .............. 107210348 U

(51) Int. Cl.
*A63F 13/24* (2014.01)
*A63F 13/98* (2014.01)
*G06F 3/02* (2006.01)

(52) U.S. Cl.
CPC .............. *A63F 13/24* (2014.09); *A63F 13/98* (2014.09); *A63F 2300/1043* (2013.01); *G06F 3/0202* (2013.01)

(58) Field of Classification Search
CPC ........... A63F 13/20; A63F 13/24; A63F 13/98
See application file for complete search history.

(56) References Cited

U.S. PATENT DOCUMENTS

| 2005/0255915 | A1* | 11/2005 | Riggs | A63F 13/22 463/37 |
| 2005/0269769 | A1* | 12/2005 | Naghi | A63F 13/06 273/148 B |
| 2008/0004114 | A1* | 1/2008 | McVicar | A63F 13/06 463/37 |
| 2008/0311992 | A1* | 12/2008 | Young | A63F 13/24 463/37 |
| 2010/0298053 | A1* | 11/2010 | Kotkin | A63F 13/24 463/37 |
| 2011/0098116 | A1* | 4/2011 | Liu | A63F 13/22 463/38 |
| 2012/0315989 | A1* | 12/2012 | Young | A63F 13/06 463/37 |
| 2014/0018173 | A1* | 1/2014 | Urhman | A63F 13/06 463/37 |
| 2015/0314193 | A1* | 11/2015 | Lee | A63F 13/24 463/38 |

(Continued)

*Primary Examiner* — Jay Trent Liddle
(74) *Attorney, Agent, or Firm* — WPAT, PC

(57) ABSTRACT

The present invention is a game controller, the game controller comprises a body, at least one socket, at least one fastening receptor, at least one actuating module, at least one fixed and at least one fastening member. The socket is formed in the body. The fastening receptor is formed in the body. The actuating module is removably mounted in the socket. The fixed frame is configured to receive the actuating module. The fixed frame comprises at least one first positioning hole. The actuating module is fixed in the socket by a combination of the fixed frame and the fastening member, wherein the fastening member passes the first positioning hole and fastens in the fastening receptor.

18 Claims, 8 Drawing Sheets

(56) References Cited

U.S. PATENT DOCUMENTS

| | | | |
|---|---|---|---|
| 2016/0351362 A1* | 12/2016 | Tsai | A63F 13/22 |
| 2016/0361634 A1* | 12/2016 | Gassoway | A63F 9/24 |
| 2017/0354867 A1* | 12/2017 | Okamura | A63F 13/24 |
| 2017/0354868 A1* | 12/2017 | Kaneko | A63F 13/235 |
| 2017/0354869 A1* | 12/2017 | Suetake | A63F 13/24 |
| 2017/0354870 A1* | 12/2017 | Okamura | A63F 13/285 |
| 2017/0354871 A1* | 12/2017 | Okamura | A63F 13/24 |
| 2017/0354872 A1* | 12/2017 | Suetake | A63F 13/24 |
| 2017/0354873 A1* | 12/2017 | Nokuo | A63F 13/213 |
| 2017/0361222 A1* | 12/2017 | Tsuchiya | A63F 13/24 |
| 2018/0158627 A1* | 6/2018 | Morita | A63F 13/2145 |
| 2018/0185749 A1* | 7/2018 | Kidakarn | A63F 13/22 |
| 2018/0333641 A1* | 11/2018 | Strahle | A63F 13/24 |
| 2018/0353850 A1* | 12/2018 | Strahle | A63F 13/22 |
| 2019/0060746 A1* | 2/2019 | Ironmonger | A63F 13/24 |
| 2019/0270006 A1* | 9/2019 | Guerrero, Jr. | A63F 13/22 |
| 2020/0030694 A1* | 1/2020 | Muramatsu | A63F 13/24 |

* cited by examiner

GAME CONTROLLER

CROSS-REFERENCE TO RELATED APPLICATION

The present application is based on, and claims priority from, Taiwan Patent Application No. 107210348, filed Jul. 30, 2018, the disclosure of which is hereby incorporated by reference herein in its entirety.

BACKGROUND OF THE INVENTION

1. Field of the Invention

The present invention generally relates to a game controller, more particularly, the game controller comprises at least one actuation module, the game controller is able to exchange a location of the actuating module to another location of the actuation module.

2. The Related Art

At present, most of game controllers are designed to operate with both hands. Some of conventional hand-held game controllers include different actuating modules to provide a user for playing game, such like action button module, directional gamepad module, thumb stick module, trigger module, bumper button module and/or paddle module. Specifically, the action button module, the directional gamepad module and the thumb stick module are disposed in a top of the game controller. The trigger module and the bumper button module are disposed in a front of the game controller. And the paddle module is disposed in a bottom of the game controller. Each actuating module represents a different game instruction in a game, which makes the game full with diversity.

With the rise of the electronic sport, it also promotes rapidly the gaming market. The game controller has more diversified control function, however, every user has different controlling habit when he operates the game controller. Some people are used to controlling the thumb stick module by their thumb, the other people are used to controlling the directional gamepad module by their thumb. However, most of the actuating modules usually be fixed on the game controller and cannot be moved; therefore, it is not able to meet the user's demand.

SUMMARY OF THE INVENTION

The present invention is to provide a game controller, the game controller comprises at least one actuating module which can be detachable, a user can replace two different locations of the actuating module.

An object of the present invention provides a game controller, the game controller comprises a body, at least one socket, at least one fastening receptor, at least one actuating module, at least one fixed and at least one fastening member. The socket is formed in the body. The fastening receptor is formed in the body. The actuating module is removably mounted in the socket. The fixed frame is configured to receive the actuating module. The fixed frame comprises at least one first positioning hole. The actuating module is fixed in the socket by a combination of the fixed frame and the fastening member, wherein the fastening member passes the first positioning hole and fastens in the fastening receptor.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

The following detailed description is merely exemplary in nature and is not intended to limit the applications and uses disclosed herein. Further, there is no intention to be bound by any theory presented in the preceding background or summary or the following detailed description.

Figure 1:
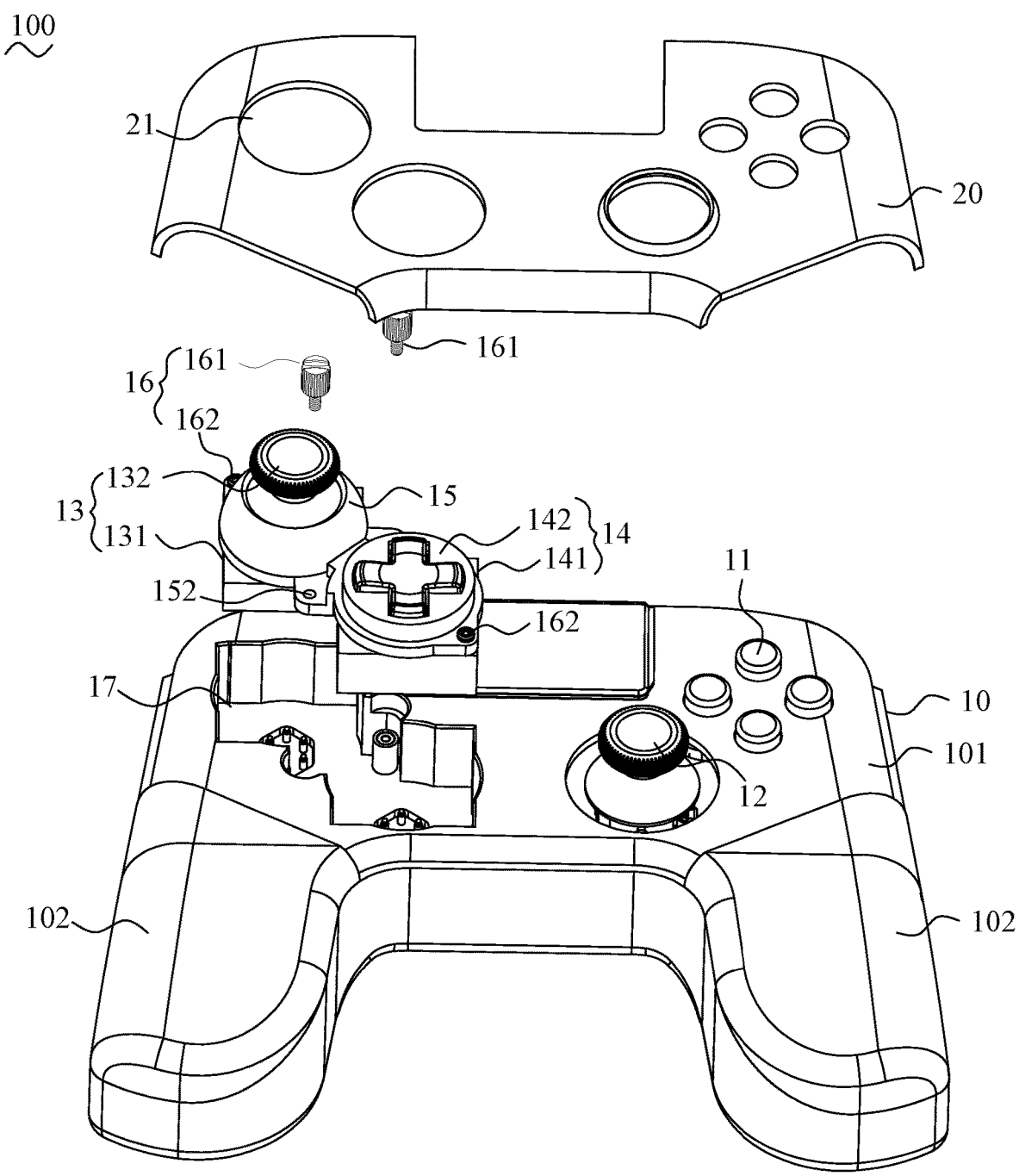
FIG. 1 is an exploded view of a game controller.

With reference to FIG. 1, a game controller 100 is shown. The game controller 100 includes a body 10, a shell 20 is removably mounted on the body 10.

The body 10 has a main portion 101 and a hand portion 102 extending from two sides of the main portion 101. The main portion 101 comprises a plurality of actuating modules which connect a circuit module inside the game controller 100. The actuating modules comprise an action button module 11, a thumb stick module 12, a first actuating module 13 and a second actuating module 14. The action button module 11 and the thumb stick module 12 are fixed in the main portion 101 of the game controller 100. The first actuating module 13 and the second actuating module 14 are capable of dismounting from the main portion 101 of the game controller 100. A socket 17 is arranged on the main portion 101 which are provided a mounting location for the first actuating module 13 and the second actuating module 14. The first actuating module 13 and the second actuating module 14 can be removably mounted in the socket 17 and fixed by a combination of a fixed frame 15 and a plurality of fastening members 16.

The shell 20 comprises a plurality of apertures 21, each location of the apertures 21 is corresponded to a location of the action button module 11, a location of the thumb stick module 12, a location of the first actuating module 13 and a location of the second actuating module 14 respectively. Specifically, a portion of the first actuating module 13 and a portion of the second actuating module 14 pass through the apertures 21 when the shell 20 is mounted on the body 10.

In some embodiment, those fixed actuating modules in the main portion 101 of the game controller 100 are not limited to be the action button module 11 or the thumb stick module 12, it would be a directional gamepad module or a same type of the actuating module.

In some embodiment, the first actuating module 13 and the second actuating module 14 would be configured to different actuating functions such as, e.g. but not limited to an action button, a directional gamepad, a thumb stick or the same type of the actuating functions. In the embodiment of the present invention, the first actuating module 13 is a thumb stick module, the second actuating module 14 is a directional gamepad module.

Figure 2:
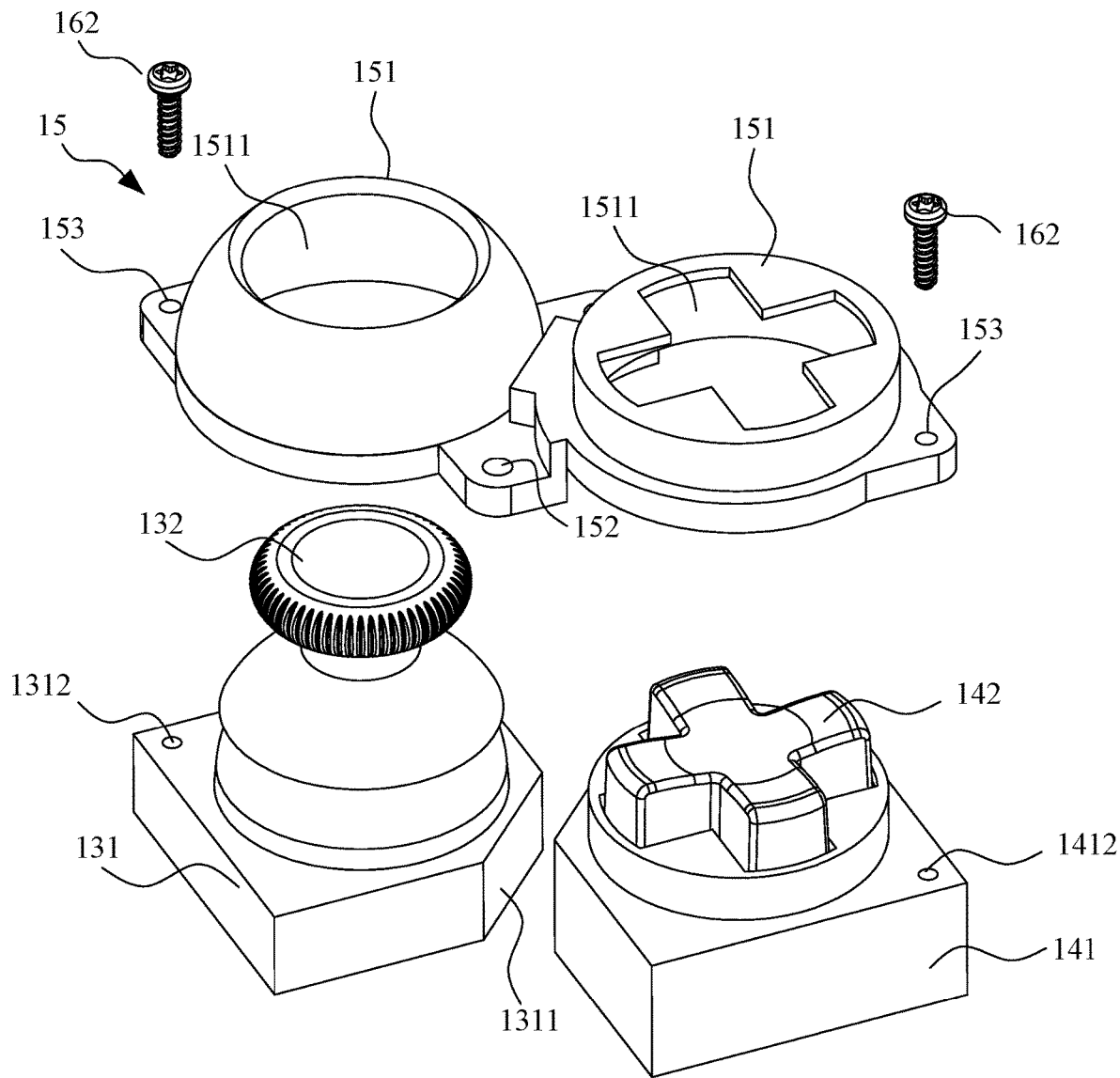
FIG. 2 is an exploded view of a first embodiment of a first actuating module, a second actuating module and a fixed frame of the game controller.
Figure 3:
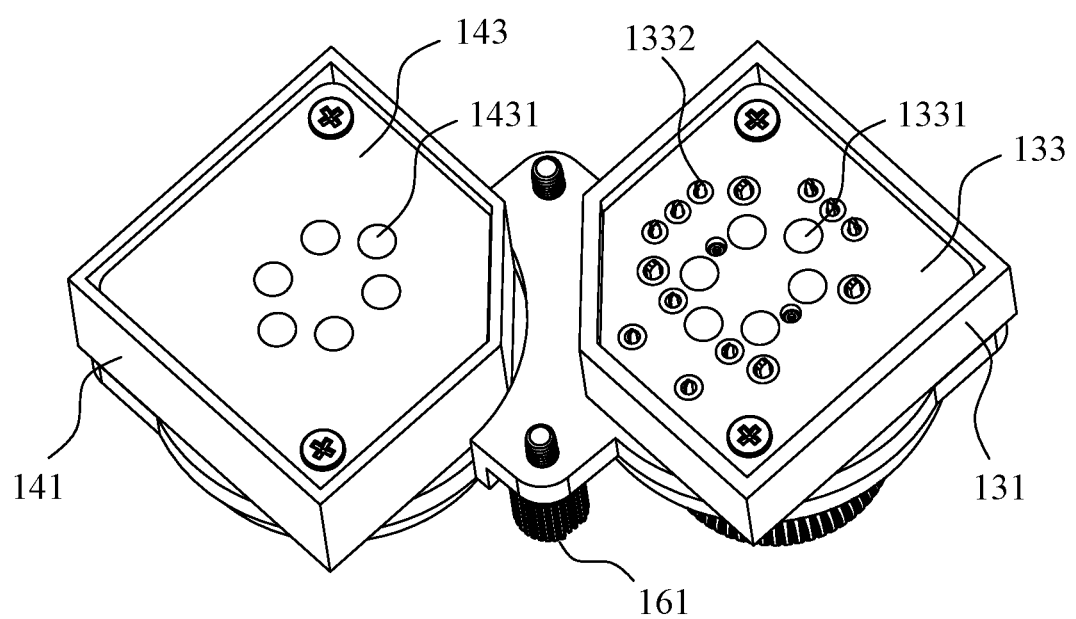
FIG. 3 is a bottom view of the first actuating module, the second actuating module and the fixed frame of the game controller, wherein the fixed frame is mounted on the first actuating module and the second actuating.

Referring to FIG. 2 to FIG. 3, The first actuating module 13 has a first base body 131, a first operating portion 132 forming from the first base body 131 thereon and a first connecting area 133 forming on a bottom of the first base body 131.

In the embodiment of the present invention, the first base body 131 is a pentagon prism. One of lateral sides of the first base body 131 is defined as a first positioning side 1311, the first positioning side 1311 is configured to position easily into the socket 17 for mounting a correct location. Specifically, the first positioning side 1311 faces toward a middle of the socket 17 when the first actuating module 13 is mounted in the socket 17. The first base body 131 has a first positioning seat 1312 which is arranged at an opposite side of the first positioning side 1311, wherein the first positioning seat 1312 has an inner screw thread.

In the embodiment of the present invention, the first operating portion 132 is a thumb stick module, the thumb stick module forms on the first base body 131 and a circuit module is arranged inside the thumb stick module. The circuit module electrically connects the first connecting area 133 forming on a bottom of the first base body 131, wherein the first connecting area 133 comprises a plurality of first pins 1331 and a plurality of first welding points 1332 of the circuit module. When the first actuating module 13 is mounted in the socket 17, a user can control the first operating portion 132 and a plurality of electric signals are passed to the first pins 1331 through the circuit module, and then the first pins 1331 electrically connect a contacting area 1711 (shown in FIG. 5) of the socket 17 to pass the user's instructions for the game controller 100.

The second actuating module 14 has a second base body 141, a second operating portion 142 forming from the second base body 141 thereon and a second connecting area 143 forming on a bottom of the second base body 141. In the embodiment of the present invention, the second base body 141 is a pentagon prism. One of lateral sides of the second base body 141 is defined as a second positioning side 1411, the second positioning side 1411 is configured to position easily into the socket 17 for mounting a correct location. Specifically, the second positioning side 1411 faces toward the middle of the socket 17 when the second actuating module 14 is mounted in the socket 17. The second base body 141 has a second positioning seat 1412 which is arranged at an opposite side of the second positioning side 1411, wherein the second positioning seat 1412 has an inner screw thread.

In the embodiment of the present invention, the second operating portion 142 is a directional gamepad module, the directional gamepad module forms on the second base body 141 and a circuit module is arranged inside the directional gamepad module. The circuit module electrically connects the second connecting area 143 forming on a bottom of the second base body 141, wherein the second connecting area 143 comprises a plurality of second pins 1431. When the second actuating module 14 is mounted in the socket 17, the user can control the second operating portion 142 and a plurality of electric signals are passed to the second pins 1431 through the circuit module, and then the second pins 1431 electrically connect the contacting area 1711 of the socket 17 to pass the user's instructions for the game controller 100.

The fixed frame 15 comprises two main bases 151 which are integrally formed, two first positioning holes 152 are arranged between the main bases 151, two second positioning holes 153 are arranged at opposite sides of the fixed frame 15 respectively. Each main base 151 has an opening 1511 for receiving the first operating portion 132 of the first actuating module 13 or the second operating portion 142 of the second actuating module 14.

In some embodiment, the main bases 151 are separated to form two fixed frames 15, each fixed frame 15 has a first positioning hole 152, a second positioning hole 153 and an opening 1511.

Specifically, the first operating portion 132 of the first actuating module 13 passes through the opening 1511 and the first base body 131 of the first actuating module 13 is restricted in the opening 1511. The second operating portion 142 of the second actuating module 14 passes through the opening 1511 and the second base body 141 of the second actuating module 14 is restricted in the opening 1511. Therefore, a shape of the opening 1511 corresponds with a shape of the operation portion, for example, in the embodiment of the present invention, the first operating portion 132 is the thumb stick module and thus the opening is a circle shape, the second operating portion 142 is the directional gamepad module and thus the opening is a cross shape. In some embodiments, if the operation portion is the action button module, the opening 1511 is formed as a plurality of apertures.

Specifically, the first positioning holes 152 are arranged at two sides of a middle between two main bases 151. In some embodiments, the middle between the main bases 151 only arranges one first positioning hole 152. In some embodiments, when the main bases 151 are separated, each of the first positioning hole 152 of the fixed frame 15 is arranged at one side of a middle between the two fixed frames 15.

Specifically, each of the opposite sides of the fixed frame 15 is arranged the second positioning hole 153. When the fixed frame 15 is mounted on the first actuating module 13 and the second actuating module 14, one of the second positioning holes 153 is corresponded to the first positioning seat 1312 and the other of the second positioning hole 153 is corresponded to the second positioning seat 1412.

Referring to FIG. 1 to FIG. 2. The fastening members 16 comprise a pair of first fastening members 161 and a pair of second fastening members 162. The first fastening members 161 are configured to pass the first positioning holes 152, the second fastening members 162 are configured to pass the second positioning holes 153. In the embodiment of the present invention, each the fastening member 16 is a screw, the first positioning holes 152 and the second positioning holes 153 have the inner screw thread.

Figure 4:
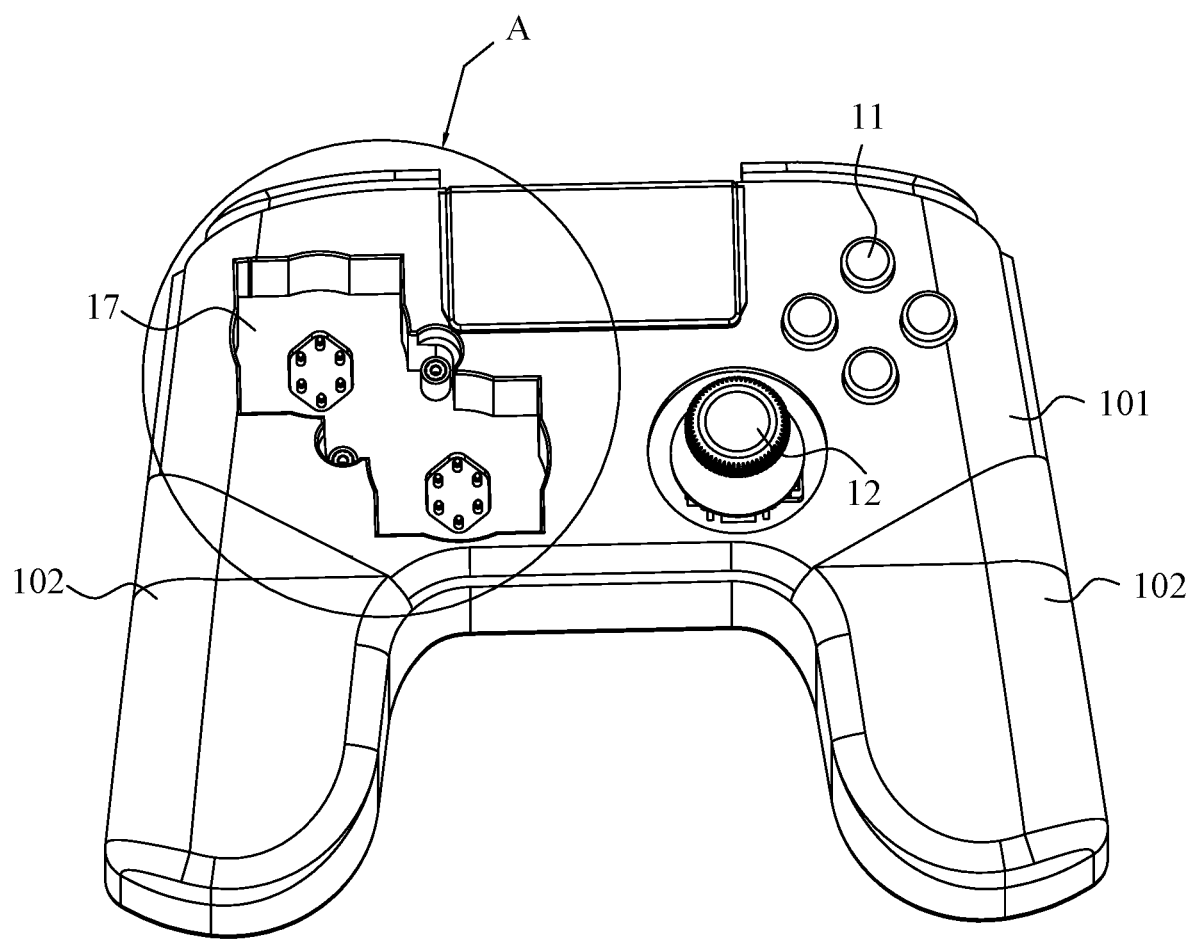
FIG. 4 is a schematic view of the game controller, wherein the first actuating module and the second actuating module are not mounted in the game controller.
Figure 5:
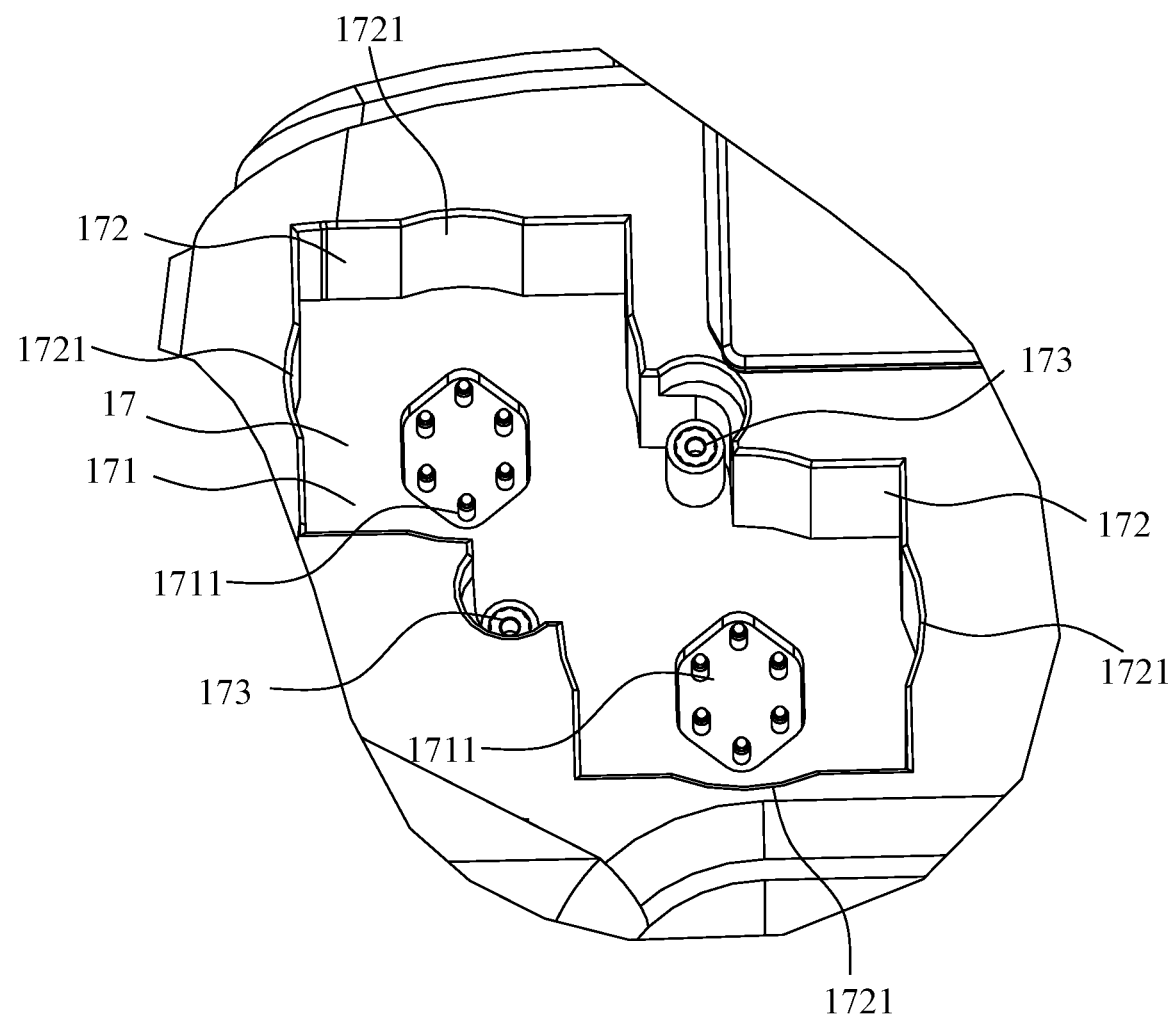
FIG. 5 is an enlarged view of a portion A of FIG. 4.

Referring to FIG. 4 to FIG. 5. The game controller 100 comprises the socket 17 which formed in the body 10. The socket 17 is a recess which is configured to accommodate the two actuating modules. The socket 17 comprises a bottom side 171, a lateral side 172 extending upward from the bottom side 171 and two fastening receptors 173 arranging in the bottom side 171.

The bottom side 171 comprises two contacting areas 1711, each contacting area 1711 is configured to a plurality of pogo pins with the same layout. When the first actuating module 13 and the second actuating module 14 are arranged in the socket 17, the first pins 1331 of the first actuating module 13 electrically connect to the pogo pins of one of the contacting areas 1711, and the second pins 1431 of the second actuating module 14 electrically connect to the pogo pins of the other of the contacting areas 1711.

The lateral side 172 comprises a plurality of position portions 1721, each position portion 1721 is an inward concave structure on the lateral side 172. When the fixed frame 15 mounts on the socket 17, the position portions 1721 are configured to match to a peripheral side of the fixed frame 15.

The two fastening receptors 173 are arranged in the middle of the socket 17, and the fastening receptors 173 divide the socket 17 into two symmetric parts of the socket 17. Specifically, the two fastening receptors 173 are arranged respectively at two sides of the middle of socket 17. When the fixed frame 15 mounts on the socket 17, a location of each of the fastening receptors 173 is configured to match to a location of each of the first positioning holes 152 of the fixed frame 15. Each fastening receptor 173 has an inner screw thread.

Figure 6:
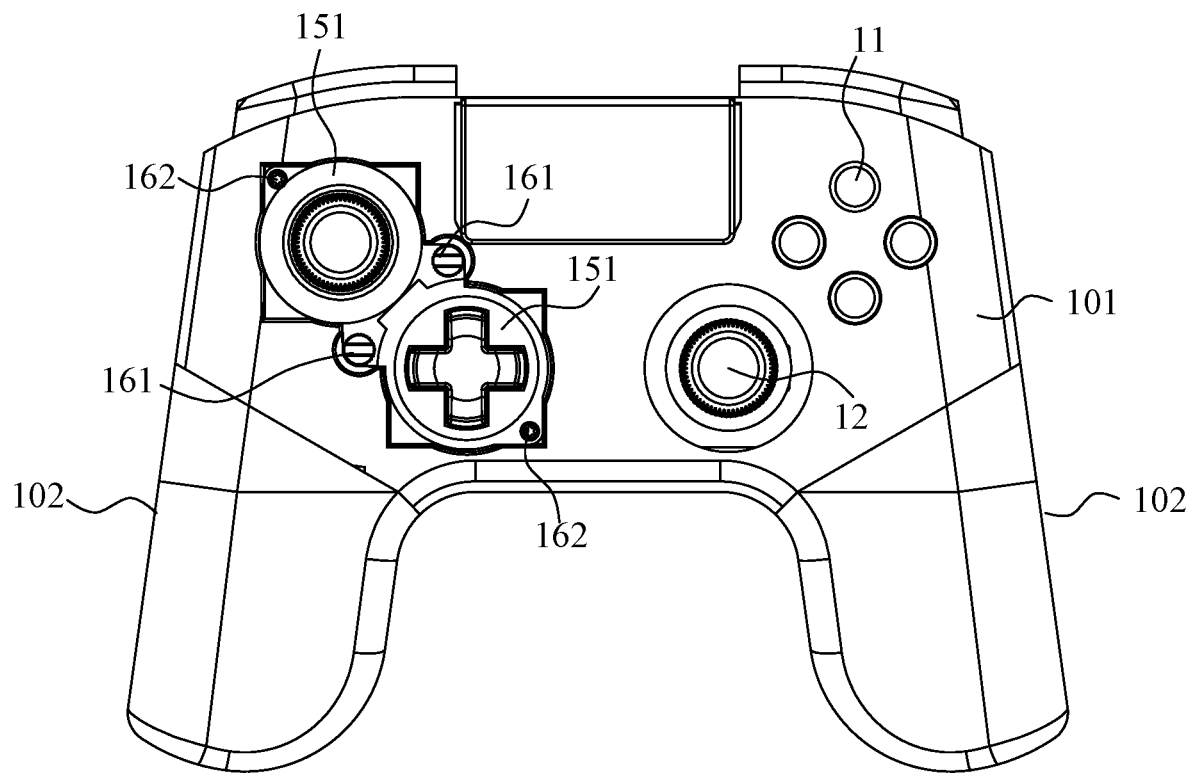
FIG. 6 is a schematic view of the game controller, wherein the first actuating module and the second actuating module are mounted in the game controller.
Figure 7:
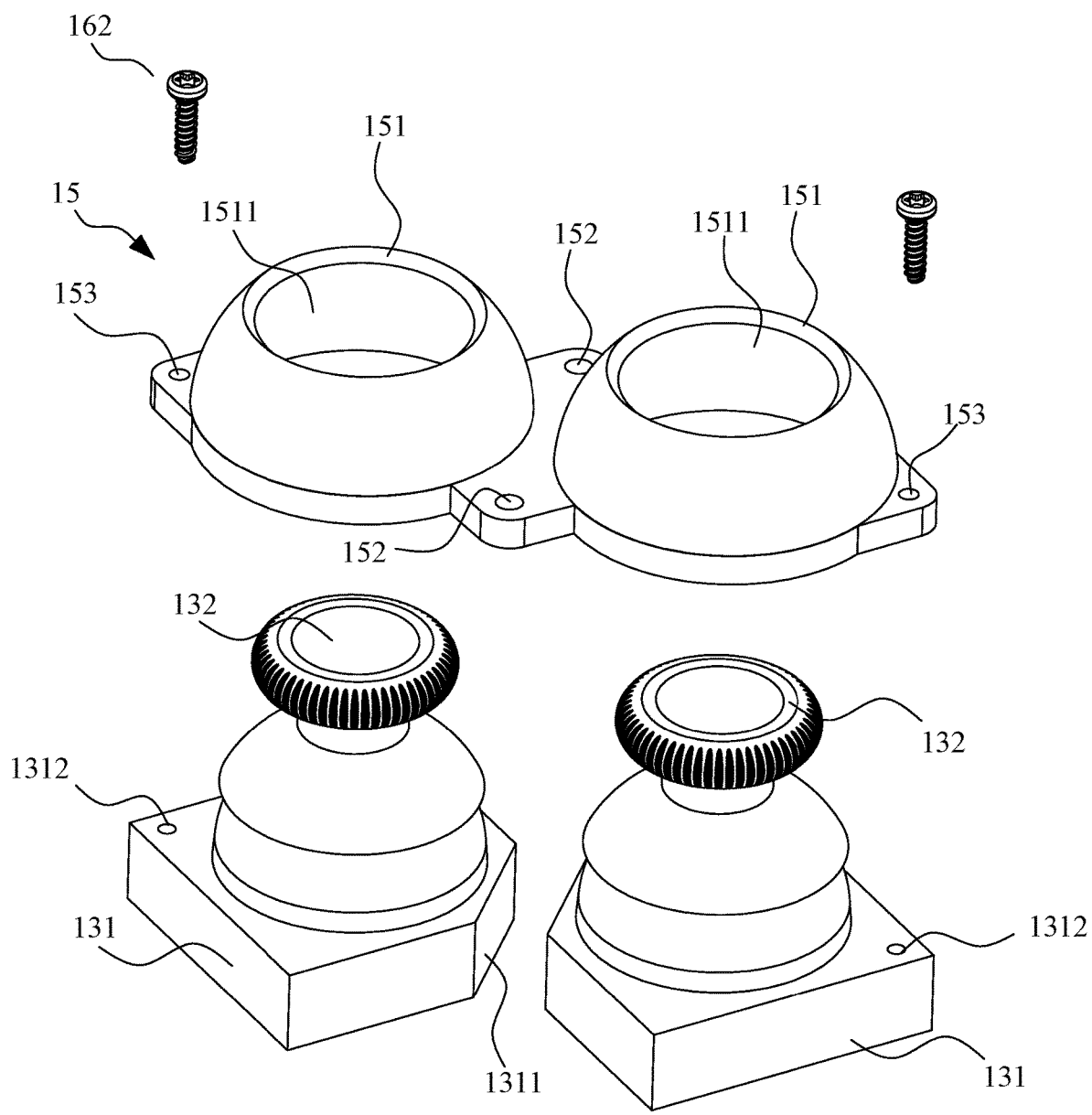
FIG. 7 is an exploded view of a second embodiment of the first actuating module and the second actuating module.
Figure 8:
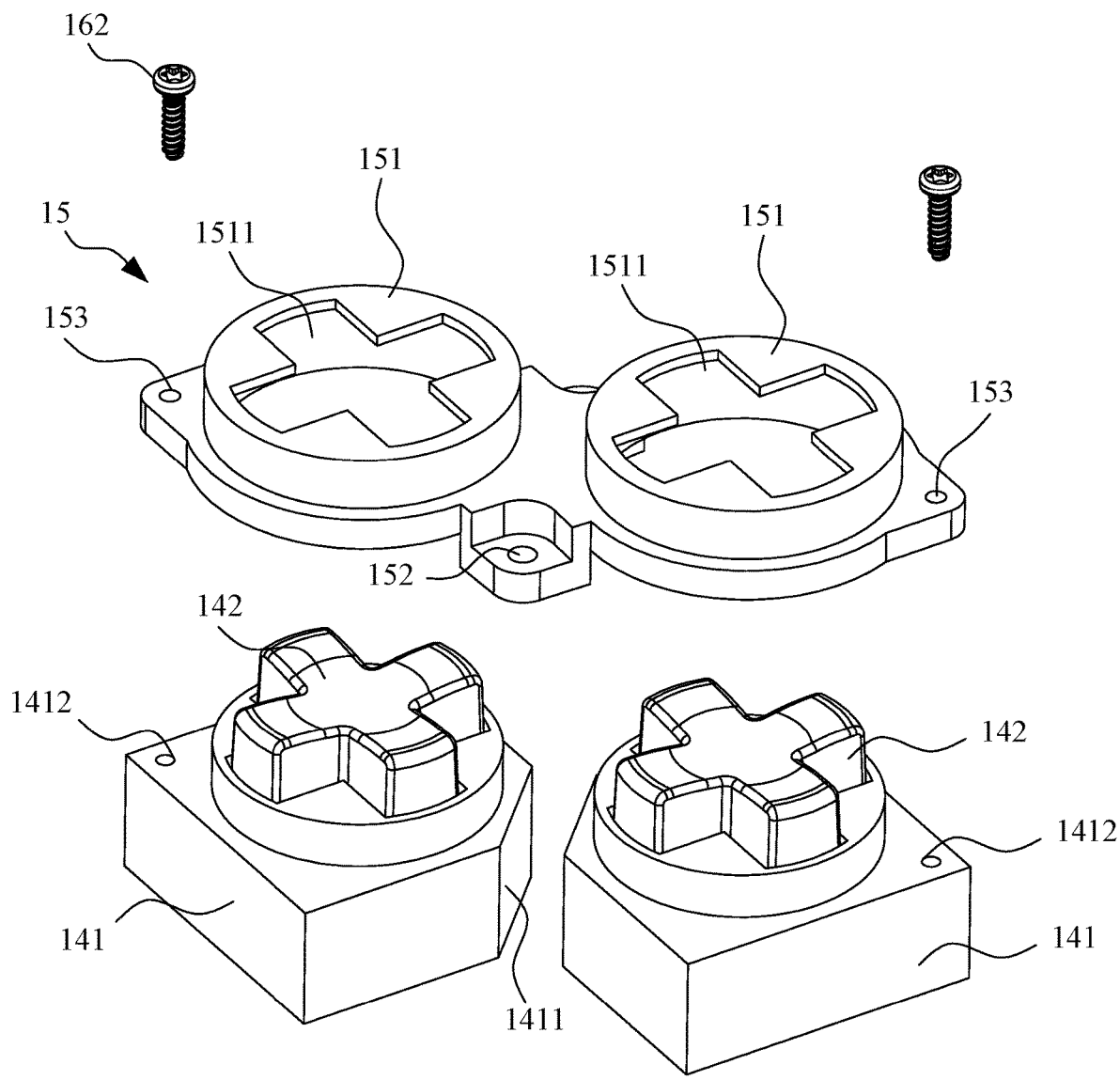
FIG. 8 is an exploded view of a third embodiment of the first actuating module and the second actuating module.

Referring to FIG. 1, FIG. 2 and FIG. 6. when the user assembles the first actuating module 13 and the second actuating module 14 into the socket 17, the user detaches the shell 20 from the main portion 101 first, and then the user takes the first actuating module 13 and the second actuating module 14 into the socket 17, wherein the first positioning side 1311 of the first actuating module 13 faces toward the middle of the socket 17, and the second positioning side 1411 of the second actuating module 14 faces toward the middle of the socket 17 as well. Specifically, the first positioning side 1311 of the first actuating module 13 and the second positioning side 1411 of the second actuating module 14 face each other. Then the fixed frame 15 is mounted on the first actuating module 13 and the second actuating module 14 by the fastening members 16. Specifically, each the first fastening member 161 passes each the first positioning hole 152 and fastens in each the fastening receptor 173, one of the second fastening members 162 passes one of the second positioning holes 153 and fastens in the first positioning seat 1312, the other of the second fastening members 162 passes the other of the second positioning holes 153 and fastens in the second positioning seat 1412. Finally, the shell 20 is assembled on the main portion 101 again.

As described above, the present invention provides the game controller 100 that the user can choose the location of the first actuating module 13 and the location of the second actuating module 14 according to user's preference, and the combination of the fixed frame 15 and the fastening members 16 is able to fix stably the first actuating module 13 and the second actuating module 14 in the game controller 100.

What is claimed is:
1. A game controller, comprising:
a body;
at least one socket formed in the body;
at least one fastening receptor formed in the body;
at least one actuating module removably mounted in the at least one socket;
at least one fixed frame, configured to receive the at least one actuating module, comprising at least one first positioning hole;
at least one fastening member;
wherein the at least one actuating module is fixed in the at least one socket by a combination of the at least one fixed frame and the at least one fastening member, and the at least one fastening member passes the at least one first positioning hole and fastens in the at least one fastening receptor; and
wherein the at least one fastening receptor is arranged in the at least one socket.

2. The game controller as claimed in claim 1, wherein the at least one socket accommodates two actuating modules.

3. The game controller as claimed in claim 1, wherein two fastening receptors are arranged in a middle of the at least one socket, and the two fastening receptors divide the at least one socket into two symmetric parts.

4. The game controller as claimed in claim 3, wherein each of the two fastening receptors has a screw thread.

5. The game controller as claimed in claim 2, wherein the at least one socket comprises two contacting areas.

6. The game controller as claimed in claim 5, wherein each of the contacting areas has pogo pins with a same layout.

7. The game controller as claimed in claim 1, wherein the at least one actuating module comprises a base body and an operating portion forming from the base body.

8. The game controller as claimed in claim 7, wherein the base body of the at least one actuating module has a positioning side for anti-mismatching with the at least one socket.

9. The game controller as claimed in claim 8, wherein the positioning side of the at least one actuating module is toward a middle of the at least one socket.

10. The game controller as claimed in claim 7, wherein the at least one fixed frame comprises at least one opening, the at least one opening receiving the at least one actuating module, the operating portion of the at least one actuating module passes through the at least one opening, and the base body of the at least one actuating module is restricted in the opening.

11. The game controller as claimed in claim 10, wherein the at least one fixed frame is provided with two openings.

12. The game controller as claimed in claim 1, wherein the at least one fixed frame further comprises a second positioning hole.

13. The game controller as claimed in claim 12, wherein the at least one actuating module comprises at least one positioning seat, and the at least one fastening member passes the second positioning hole and fixes into the at least one positioning seat.

14. The game controller as claimed in claim 13, wherein the at least one positioning seat has a screw thread.

15. The game controller as claimed in claim 1, wherein the at least one actuating module is one of an action button module, a directional gamepad module, or a thumb stick module.

16. The game controller as claimed in claim 1, further comprising at least one position portion arranged in an inner side of the at least one socket, wherein the at least one position portion is provided a positioning structure for the at least one fixed frame.

17. The game controller as claimed in claim 1, wherein the at least one fastening member is a screw.

18. The game controller as claimed in claim 1, further comprising a shell with at least one aperture, wherein the shell is removably mounted on the body and a portion of the at least one actuating module passes through the at least one aperture.

* * * * *